United States Patent [19]

Siegal

[11] 4,275,381
[45] Jun. 23, 1981

[54] OPERATOR READABLE AND MACHINE READABLE CHARACTER RECOGNITION SYSTEM

[76] Inventor: Richard G. Siegal, 515 W. Barry St., Chicago, Ill. 60657

[21] Appl. No.: 109,039

[22] Filed: Jan. 2, 1980

[51] Int. Cl.$^3$ .............................................. G06K 9/18
[52] U.S. Cl. ............................... 340/146.3 Z; 235/495
[58] Field of Search ............... 340/146.3 SY, 146.3 Z, 340/146.3 A, 365 R; 178/30; 235/494, 495

[56] References Cited

U.S. PATENT DOCUMENTS

| | | | |
|---|---|---|---|
| 3,058,093 | 10/1962 | Vernon et al. | 340/146.3 Z |
| 3,351,906 | 11/1967 | Van Duuren | 340/146.3 Z |
| 3,485,168 | 12/1969 | Martinson | 340/146.3 Z |
| 3,559,170 | 1/1971 | Barnes | 340/146.3 Z |
| 3,596,249 | 7/1971 | Tierney | 340/146.3 Z |
| 3,611,292 | 10/1971 | Brown et al. | 340/146.3 Z |
| 3,699,518 | 10/1972 | Greenough et al. | 340/146.3 Z |
| 3,735,097 | 5/1973 | Zeitlin | 340/146.3 Z |
| 3,776,454 | 12/1973 | Jones | 340/146.3 Z |
| 4,132,976 | 1/1979 | Siegal | 340/146.3 Z |

Primary Examiner—Leo H. Boudreau
Attorney, Agent, or Firm—Hill, Van Santen, Steadman, Chiara & Simpson

[57] ABSTRACT

A character recognition system incorporating a matrix of nine primary locations and four secondary locations, has a family of operator readable and machine readable alpha-numeric characters formed in relation to the matrix. Characters are designated by marking or not marking selected ones of the primary and secondary locations. The primary locations are scanned first to determine whether the combination of primary locations which is marked determines a single character. If not, the secondary locations are scanned to determine a unique character.

6 Claims, 5 Drawing Figures

OPERATOR READABLE AND MACHINE READABLE CHARACTER RECOGNITION SYSTEM

BACKGROUND OF THE INVENTION

1. Field of the Invention

The present invention relates to a character recognition system and more particularly to a system in which alpha numeric characters may be hand written, with such characters being machine readable and also capable of being read as ordinary appearing alpha numeric characters.

2. Description of the Prior Art

As data processing equipment becomes more common, and the range of applications of such equipment increases, the problem of data entry assumes a more important aspect. In the past, it has been conventional to enter data by means of a key-punch machine, by which punched cards are produced through the efforts of a key-punch operator. More recently, key-to-tape and key-to-disk systems have become available, but they also require the use of a human operator whose function is solely to convert data from human readable form to machine readable form. This technique of data entry, requiring the use of a translator, is an obstacle to achieve an efficient data entry, and also represents a source of errors and inaccuracies.

Some machines have been devised to optically read certain kinds of print or typing, but these machines are not able to read characters written by hand, because of the lack of uniformity and size of such characters.

A great variety of machine readable families of characters have been devised in the past. These characters, with few exceptions, have generally not been equally well adapted for recognition by the human operator and for machine reading. The more suitable a family of characters is for machine reading, the less feasible it is to provide for visual recognition of the characters. The exceptions consist of families having relatively few characters. Although the familiar magnetically coded set of characters includes aliphatic characters as well as numerals, the alphabetic characters are rarely used, both because of their lack of similarity to conventional printed characters, and because of the difficulties encountered in decoding such characters. Moreover, the magnetically coded set is not adapted for being written by hand without the use of machinery especially constructed for that purpose.

While it is possible to train an operator to recognize esoteric symbols and codes which are designed primarily to be machine readable, such arrangements are not suitable for use by relatively unskilled persons, but are effectively restricted to highly skilled personnel or else require complicated coding machines.

In Siegal U.S. Pat. No. 4,132,976, a family of characters is described which is both operator-readable and machine-readable. While the system in that patent is adequate for a variety of purposes, the use of the system involves some limitations which it is desirable to overcome.

SUMMARY OF THE INVENTION

The principal object of the present invention is to provide a character recognition system in which a family of characters may be readily written and read by a human operator as well as by a machine.

Another object of the present invention is to provide such a system in which a relatively unskilled operator may readily and accurately enter input into a data processing system or the like, by means of written characters which are scanned in order to determine the presence or absence of portions of said characters coincident with discrete locations within a fixed array.

These and other objects and advantages of the present invention will become manifest upon an examination of the following description and accompanying drawings.

In one embodiment of the present invention there is provided a character recognition system comprising scanning means for optically scanning each of nine discrete primary positions within a 3×3 array, and four secondary discrete positions within said array, each of said secondary positions being surrounded by four primary positions, means responsive to said scanning device for determining the presence or absence of handwriting at each discrete position within said array, and output means for manifesting a character corresponding to the scanned array.

BRIEF DESCRIPTION OF THE DRAWINGS

Reference will now be made to the accompanying drawings in which.

DESCRIPTION OF THE PREFERRED EMBODIMENTS

Figure 1:
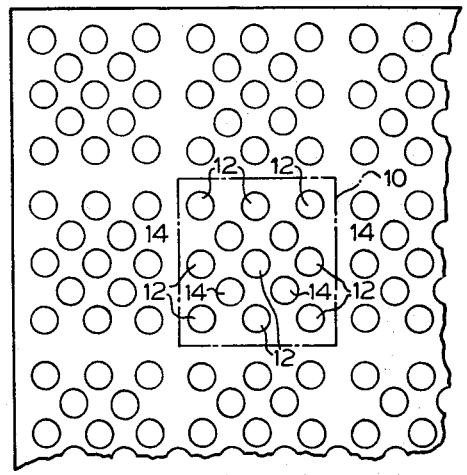
FIG. 1 is an illustration of a first embodiment of the background array.

Referring to FIG. 1, a background array is illustrated which incorporates the first embodiment of the present invention. An area 10 of the background array has nine primary discrete positions 12 and four secondary discrete positions 14. The positions 14 are arranged in a 3×3 matrix, forming four juxtaposed squares, and the four secondary positions 14 are located in the middle of each of the four squares, surrounded by four primary positions 12.

The described arrangement is replicated over a sheet of paper or the like which comprises a form facilitated in the entry of data onto the paper by a human operator. Data is entered onto the form by writing with pen and ink characters in a normal way such as the H and N illustrated in FIG. 3 and 4 respectively. It will be seen that the lines forming the characters pass through some of the discrete positions and not others, and sensing the discrete positions associated with the lines of the drawn characters identify such characters completely.

Figure 3:
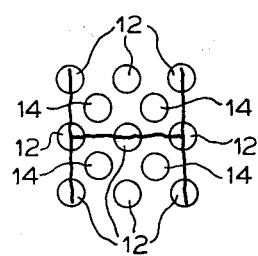
FIG. 3 is an illustration of the letter H appearing on a background array.
Figure 4:
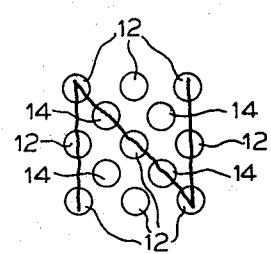
FIG. 4 is an illustration of the letter N appearing on a background array.

It is to be observed in FIGS. 3 and 4 that the H and N pass through the same primary positions, and may be distinguished only because the N passes through two secondary positions as illustrated.

Figure 2:
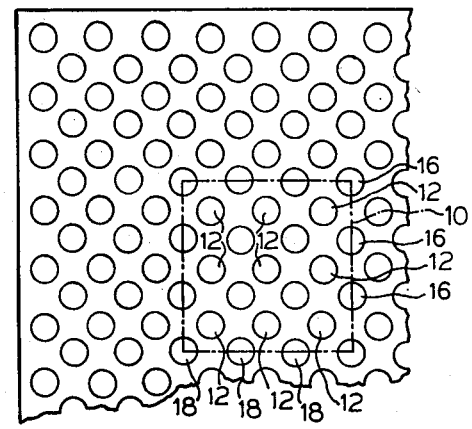
FIG. 2 is an illustration of an alternative background array.

FIG. 2 shows an alternative arrangement of the present invention, in which additional secondary positions 16 and 18 are illustrated. The secondary positions 16 are located on the right hand edge of the area 10, which is in common with the left hand edge of the corresponding area located immediately to the right of the area 10. The secondary positions 18 are located at the bottom edge of the area 10 which is also the top edge of the corresponding area immediately below the area 10. From FIGS. 1 and 2 it is apparent that the specific character areas such as the area 10 of the background array are discrete, and surround each group of secondary positions 14 and the symmetrically located primary positions which surround them. By contrast, the character areas of the background array shown in FIG. 2 are not discrete. The character area 10 may be formed of any nine primary loctions arranged in a square, as illustrated. Thus, while the background array illustrated in FIG. 1 assists in the entry of data in straight lines, and results in entered data in regular rows and columns, the background array of FIG. 2 facilitates different spacings between horizontal lines of characters when desired, and also facilitates different spacings between the characters themselves. In addition, the background array of FIG. 2 facilitates subscripts and superscripts, when the character areas 10 are not all located on the same horizontal line, but are offset upwardly or downwardly from such line.

Figure 5:
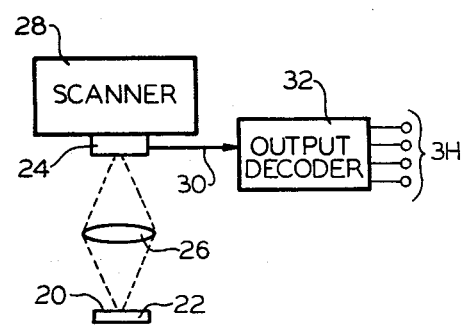
FIG. 5 is a functional block diagram of a system for scanning and recognizing marks within the discrete positions of the array.

FIG. 5 illustrates diagramatically, equipment for reading characters which are written using the present invention. The background array 20 supported on a support member 22, and light (reflected or transmitted) is received by a photo-sensitive element 24 from a primary or secondary position of the array through an optical system incorporated in a lens 26. The photo-sensitive device 24 is mechanically moved relative to the surface 20 by means of a scanning unit 28, so that the primary and secondary positions of the character area are scanned in sequence, with the output line 30 of the photo-sensitive device 24 producing a binary signal indicating whether each position contains a mark or not a mark. The line 30 is connected to the input of an output decoder 32 which supplies the output terminals 34 binary coded signals indicative of the character within the character area being scanned. The output decoder 32 is a data processing system for identifying characters recognized from the signals on the line 30. Reference is made to the aforesaid Siegel U.S. Pat. No. 4,132,976 for details concerning the mechanical, optical and electrical systems. The disclosure of the Siegel U.S. Pat. No. 4,132,976 is hereby incorporated by reference into this specification.

The details of the specific units employed for the optical, mechanical and electrical functions of the apparatus shown in FIG. 5 form no part of the present invention.

Although only two hand drawn letters are shown in FIGS. 3 and 4 of the drawings, it will be appreciated that a number of additional hand drawn letters will pass through some of the secondary positions, so that the secondary positions may be employed to identify such a character within a character area being scanned. Although the background array is of greater complexity than that described in the aforementioned Siegel U.S. Pat. No. 4,132,976, it is not so complex as to afford difficulties to a human operator using the background array to form individual characters in the usual manner, such as the H and the N illustrated in FIGS. 3 and 4. Other characters may be formed in the way illustrated in the aforementioned Siegel patent, and it will be apparent which of such characters have lines passing through the secondary positions.

The character set used with the present invention is not limited to any particular character set, but the character set illustrated in the aforementioned Siegal patent may be used if desired, or a restricted portion of such character set may be used in situations which do not require the use of every member of the character set. It will be found that some of the characters of a character set are restricted to lines which pass through primary positions only, in that event, it is not necessary to scan the secondary positions at all, thereby increasing the speed at which written information may be scanned. An example of such a character is the letter T, which uses only the top three primary locations of the top row and the center location of the second and third rows of a character area. In the character set described in the aforementioned Siegel patent, the combination of primary locations employed for the letter T is unique, and no secondary locations need be scanned in order to allow the letter T to be machine readable. In contrast, although the letter H uses only primary locations, the letter N uses the same primary locations and it is therefore necessary to scan secondary locations in order to distinguish a H from N. Therefore, the selective scanning of secondary locations, when necessary to resolve an ambiguity resulting from two or more characters sharing the same combination of primary locations, results in the possibility of substantially increased scanning speed without sacrificing the extra resolution obtainable through use of the secondary locations.

The areas within the primary and secondary locations of the background array are the only areas of the character bearing surface which are scanned. Accordingly, the presence of a mark or not a mark in any other area of the surface is not significant to recognition of the characters thereon. Accordingly, any foreign matter present on the surface bearing the characters outside the primary and secondary positions is ignored, and of no significance in the recognition of the characters. This makes it possible for an operator to make marks on the character bearing surface if desired, with the knowledge that such marks will be ignored during the machine reading process. Such marks may constitute for example, underlining of certain characters, or lines encircling one or more characters. Restricting scanning only to the areas within the primary and secondary locations decreases the sensitivity of the machine reading system to noise resulting from extraneous marks on the character bearing surface.

The primary and secondary locations are identified by circles in the embodiments illustrated in FIGS. 1 and 2, but they may be other shapes such as squares or triangles if desired for any reason. If desired, the locations may be printed in the form of circles or other shapes on the character bearing surface to guide a human operator in making a character which passes through the appropriate primary and secondary locations. If desired, the ink with which such positions are printed may be of a color which is invisible to the photo-sensitive device 24 used during scanning. Otherwise they are printed uniformly to provide the same background signal input to the photo-sensitive device 24.

The size of the circles or other shapes defining the primary and secondary locations may be of a different size than that illustrated. Increasing the size of the circles facilitates data entry, by making the appropriate circles easy to hit when an operator is entering data manually. Reducing the size of the circles increases the signal to noise ratio during machine reading, and facilitates distinguishing primary and secondary locations which have lines through them from those that do not. A compromise between these considerations leads to the use of circular areas for the primary positions which are spaced from each other by a distance equal to their diameter.

It will be apparent that various modifications and additions may be made in the apparatus and methods of the present invention, which are intended to be defined and secured by the appended claims.

What is claimed is:

1. A method of entering data into a data processing system, comprising the steps of:
   providing a character bearing surface having an area designated with a plurality of spaced apart primary locations arranged in three rows and three columns and a plurality of secondary locations each surrounded by four of said primary locations,
   placing a hand written mark in the form of a character on said surface passing through any part of at least one of said locations to mark said location, and
   providing a data processing system having a scanning device for scanning said surface and producing signals representative of locations which have a mark placed therein and for producing no signals in response to marks on said surface not within one of said locations, whereby said signals define a binary representation of said character.

2. The method according to claim 1, including the step of employing said scanning device to scan said primary location and employing said data processing to determine whether the combination of marked primary location identifies a single character and to thereupon omit scanning of said secondary location.

3. The method according to claim 2, including the step of subsequently scanning said secondary location when the combination of marked primary location does not identify a single character.

4. The method according the claim 1 including the step of providing said surface with a multiplicity of areas each designated with a 3×3 matrix of shapes designating primary locations, and four shapes designating secondary locations, and placing hand written marks in a plurality of said areas designating alphanumeric characters for use in a character recognition system.

5. The method according to claim 4, including the step of providing said surface with additional secondary location, such that each four juxtaposed primary locations which form a rectangle have a secondary location within such rectangle.

6. Apparatus for reading a character comprising:
   scanning means for scanning a plurality of spaced apart,
   localized areas of a surface bearing hand written marks,
   means for producing electrical representations of the presence of a mark or no mark within nine of said localized areas arranged in three rows and three columns, and the presence of a mark or no mark without four localized areas each centrally located among four of said primary areas, and for not recognizing the presence of marks outside said localized areas; and output means for manifesting a coded binary representation of a character corresponding to the combination of marks and no marks within said thirteen areas.

* * * * *